United States Patent

[11] 3,582,208

| [72] | Inventor | Lester E. Idler<br>1029 South Chantilly, Anaheim, Calif.<br>92806 |
|---|---|---|
| [21] | Appl. No. | 642,899 |
| [22] | Filed | June 1, 1967 |
| [45] | Patented | June 1, 1971 |

[54] METHOD AND MEANS FOR PRODUCING MULTIDENSITY TINT SCREENS
7 Claims, 9 Drawing Figs.

[52] U.S. Cl. .................................................. 355/132, 96/44
[51] Int. Cl. ........................................ G03b 27/10
[50] Field of Search .......................................... 355/52, 132; 96/44

[56] References Cited
UNITED STATES PATENTS

| 812,748 | 2/1906 | Ippers | 96/44 |
| 1,725,395 | 8/1929 | Fruwirth | 96/44 |
| 2,830,491 | 4/1958 | Domeshek | 355/52X |
| 2,960,015 | 11/1960 | Rodine | 95/1 |

*Primary Examiner*—John M. Horan
*Attorney*—Harvey C. Nienow

ABSTRACT: The specification describes a process for making tint screens for lithography which have areas of different density using only a single master tint screen of uniform density. In the process areas of a film which is to become the tint screen are exposed to point light sources rotated circularly at one diameter relative to the film to produce one shade density at another diameter to produce another shade density. Apparatus for practicing the invention and comprising a film holder and rotatable light source is also described.

PATENTED JUN 1 1971 3,582,208
SHEET 1 OF 2
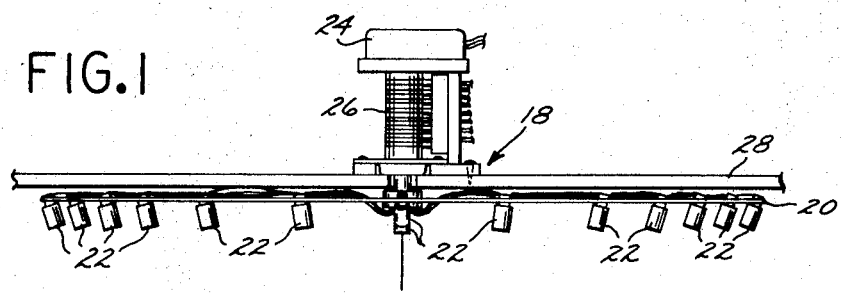
FIG.1
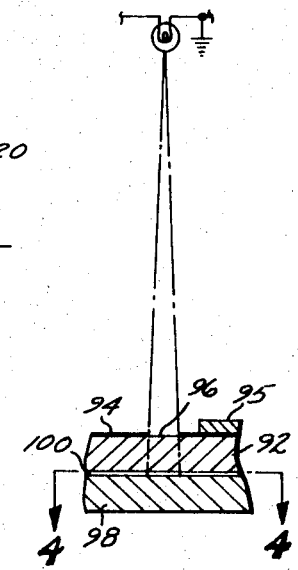
FIG.3
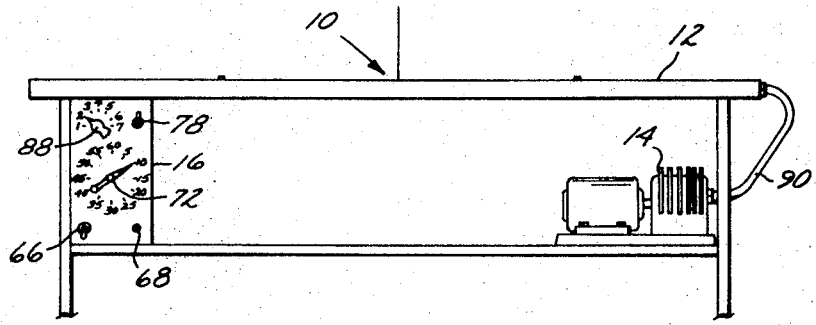
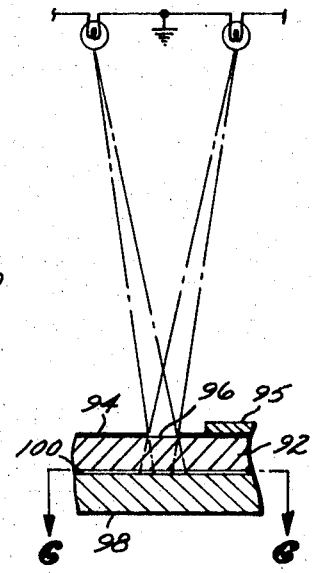
FIG.5
FIG.8
FIG.4
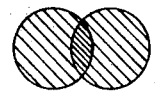
FIG.6
INVENTOR.
LESTER E. IDLER
BY
ATTORNEY

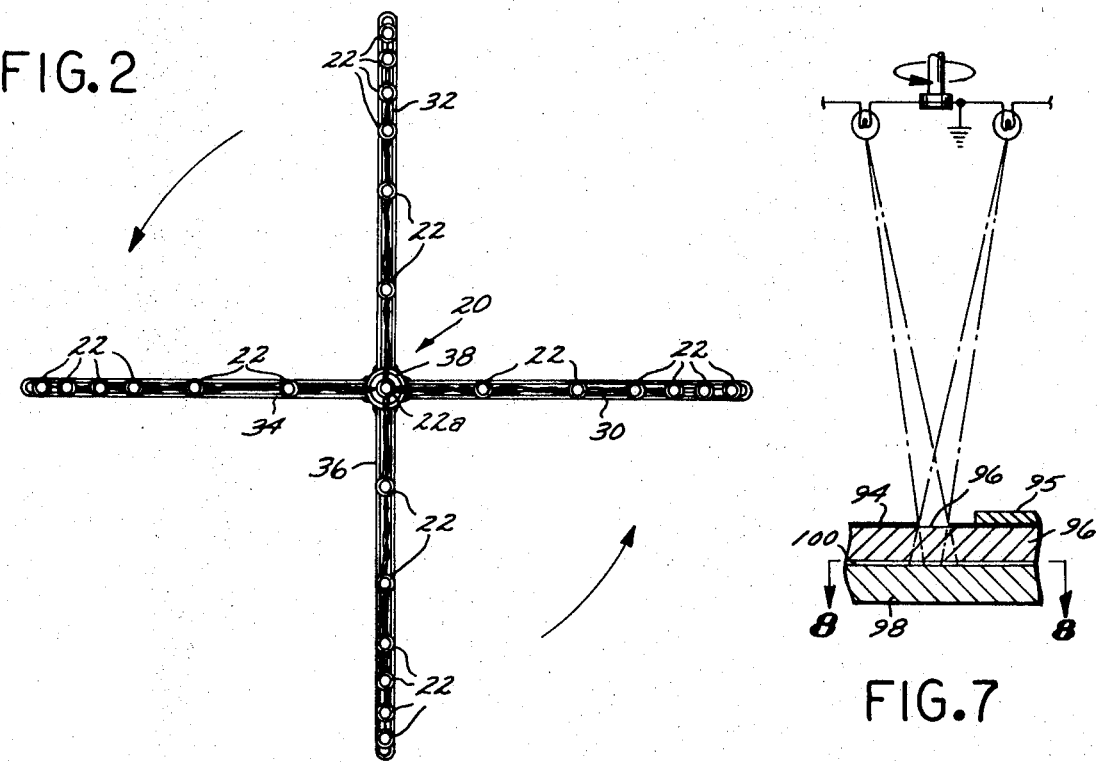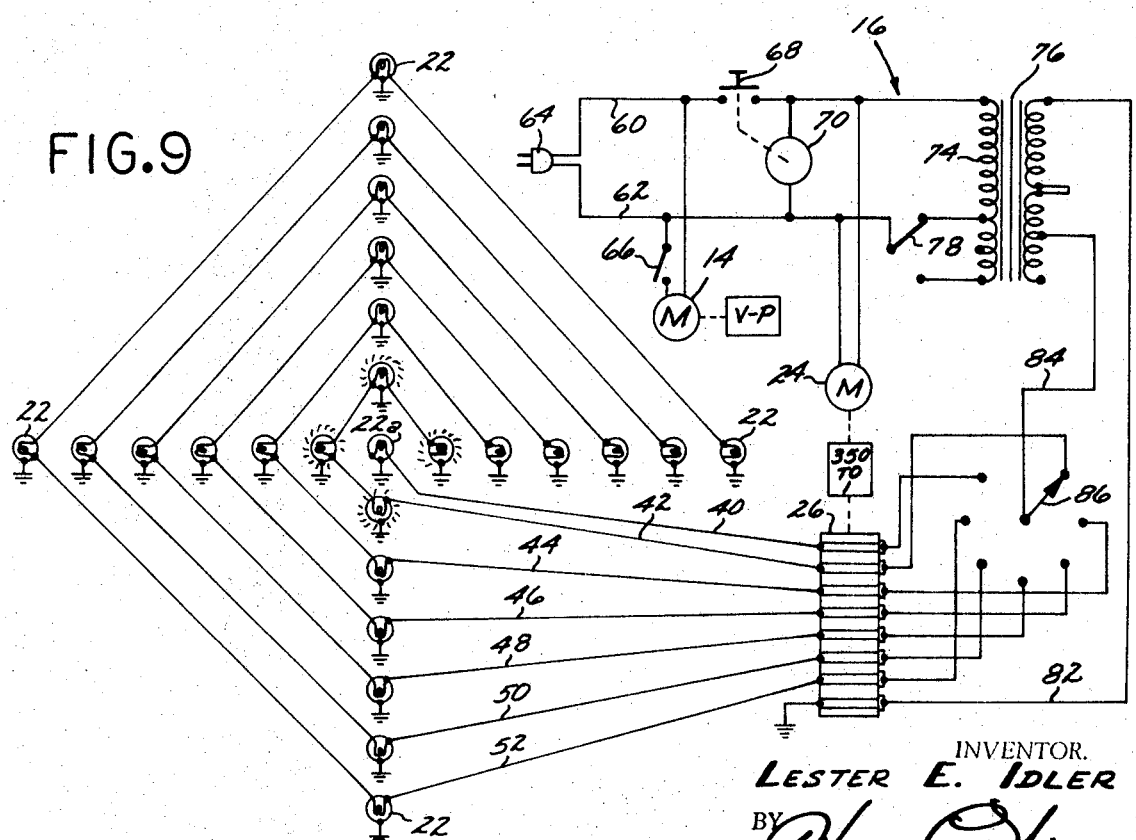

METHOD AND MEANS FOR PRODUCING MULTIDENSITY TINT SCREENS

This invention relates to a method for producing photographic tint screens for lithography and to apparatus for practicing the process. In particular it relates to the production of tint screens several areas of which are to have different densities.

It is well known in lithography to accomplish shading of areas by the use of Benday screens to produce the plates that print the shaded areas. Modernly a Benday screen or tint screen comprises a sheet of exposed film which has uniformly shaped and spaced exposed and unexposed areas. While such screens are made in a variety of patterns, the tint screens employed in the invention are advantageously formed using dot hole patterns. The size and the spacing of the dots determines the relative proportions of the light and dark areas or the percentage of shading. The invention will be described in connection with tint screens formed of holes although it is not limited to that pattern. Film exposed through unmasked areas of the tint screen is developed to reveal a pattern of dots at the unmasked area. If another area of the film is also to appear shaded, the screen over it is also left unmasked. But if the two areas to be shaded are to be shaded in different degree, then the practice has been to use screens of different density or to vary the time of exposure or some other parameter of the photographic process in the case of one of the areas to be shaded. Both of these courses of action have serious disadvantages. To use tint screens of different density often requires cutting of the screen so that pieces of the selected screens can be placed over the areas of film to be shaded. Not only is this expensive in that it consumes screens but serious mechanical problems are encountered in having nonuniform overlays on the film. The problems include difficulty in holding the film and masking in place without disturbing the emulsion on the film. One alternative has been to use multiple exposures employing different tint screens and mask setups successively and this solution too is time consuming and expensive. The other solution to the problem has been to employ only one tint screen and to achieve different shading by varying exposure time, or when the shaded areas were separated, by variations in the chemical phase of film development. This solution requires a high degree of skill and artistry especially when a number of illustrations are to be made in which the shading is similar.

To illustrate the latter point, the use of tinting is especially effective in producing illustrations for operating manuals and technical instruction books where tinting is used not only to simulate the third spacial dimension but is also used to add dimension, differentiation, and degree to other concepts. If several illustrations are employed in which degree of shading distinguishes a thing or idea then the shading must be consistently dense throughout the several illustrations. In the past, practical considerations have often dictated that the shading be varied manually be some process parameter and a high order of artistry was required to maintain uniformity among corresponding tints in related illustrations.

This invention has as one of its objects the provision of a method and means for overcoming these problems and disadvantages. Thus an object of the invention is to enable production of tint screens having areas of different density or shade from a single master tint screen without the need for artistry or special skill.

Another object is to enable production of tint screens in which the density of related areas on several screens can be made the same without the need for artistry or special skill.

Another object is to provide an improved process and related apparatus for apparatus for producing illustrations employing tinted areas.

These and other objects and advantages of the invention will hereinafter be apparent in the description of the process and the apparatus by which it is advantageously practiced, it being understood that various modifications may be made in the method and embodiment described without departing from the spirit of the invention.

In the drawings:

FIG. 1 is a drawing in side elevation of a vacuum table and a light source which embody the invention and are suitable for its practice;

FIG. 2 is a bottom view of the light source taken on line 2-2 of FIG. 1;

FIG. 3 is a diagram illustrating how a film is exposed through a tint screen from a point source;

FIG. 4 is a diagram of the dot exposure resulting from the situation diagrammed in FIG. 3;

FIG. 5 is a diagram showing how a film is exposed through a tint screen from a dual point source of light;

FIG. 6 is a diagram of the exposure resulting from the situation depicted in FIG. 5;

FIGS. 7 and 8 are, respectively, a diagram illustrating how a film is exposed through a tint screen by rotating point sources of light and a diagram of the dot resulting from such exposure; and FIG. 9 is a circuit diagram of the light source and its rotating mechanism.

Referring to the drawings and first to FIG. 1, there is shown an apparatus for producing tint screens according to the invention. A work stand, generally designated 10, is shown in the lower portion of FIG. 1 to comprise means for holding a flat, unexposed film. Advantageously, as shown, this means comprises a vacuum table 12 forming the top of stand 10 and a motor-driven vacuum pump 14. The stand further comprises means for controlling and selectively illuminating a light source. This means advantageously comprises an electrical controller 16.

Means are provided for illuminating the space above the vacuum table 12. This means advantageously has the preferred form shown in the drawings. It comprises a light source generally designated 18 consisting of a frame 20, a number of point sources of light 22 mounted on the frame, and means for rotating the point sources circularly relative to the vacuum table 12. As shown, the frame is here rotated by a motor 24. Electrical connection between the point sources of light and the controller 16 is maintained by a slip ring and brush assembly 26.

The light source is mounted on a supporting structure 28 which is fixed relative to the stand 10. More particularly the drive motor and brushes are fixed to the support structure and the slip rings and frame 20 are rotatable about the motor shaft axis which, advantageously as shown, is normal to the central area of the vacuum table 12. As best shown in FIG. 2, the point sources of light 22 are arranged in circular banks (except that one, 22a, is mounted on the axis of rotation). In the embodiment selected for illustration each bank consists of four point source lamps mounted at equal distance from the axis of rotation and equally spaced by being placed on radial lines emanating from the axis 90° from one another. All of the lamps are mounted, in this embodiment, on the same four radial lines whereby the frame may be, and is, constructed in the form of four radial arms designated 30, 32, 34, 36 and connected to a central hub 38.

The individual lamp circuits are shown in FIG. 9. The numeral 40 designates the circuit from the slip ring assembly through lamp 22a to ground. The numeral 42 designates the circuit from the slip ring assembly through the four lamps of the innermost bank of lamps 22 in FIG. 2. Similarily the numerals 44, 46, 48, 50 and 52 designate the circuit from the slip ring assembly to ground through the banks of four lamps which are at successively greater distance respectively from the axis of rotation of the frame 20. Thus circuit 52 includes the outermost lamp at the end of each of arms 30, 32, 34 and 36. The return line through the bottom slip ring is common to all lights.

Referring to FIG. 9, the controller 16 includes a pair of inlet power lines 60 62 which originate in a plug 64 adapted for connection to an external source of electrical power. The motor 14 of the motor-driven vacuum pump is connected across power lines 60 and 62 through an energizing switch 66. The motor circuit is in parallel with the lighting circuit and is energizable and deenergizable independently of the lighting circuit. Energization of the lighting circuit is controlled by a timer switch 68 which is coupled to an electrically powered timer 70. The switch 68 is connected in series with power line 60 and the timer is connected across the power lines 60 and 62 on the side of switch 68 away from m the source and connector plug 64. Manually actuating the normally open switch 68 closes the circuit energizing timer 70, motor 24 and transformer 76. The timer goes through the time cycle set at its time selection mechanism 72 (see FIG. 1). At the expiration of the selected time it opens switch 68 to deenergize timer 70, motor 24 and transformer 76.

The lighting circuitry comprises two parallel branches both connected across the power lines. One circuit includes the lamp assembly drive motor 24 and the other includes the tapped primary winding 74 of a transformer 76 in series with a tap selection or "Hi-Lo" voltage switch 78 by which one of the taps of the primary 74 may be selected to control the degree of illumination of point sources 22.

The secondary winding 80 of the transformer 76 is connected at one end by line 82 to electrical ground on the lamp frame 20 through one of the slip rings and its brush. The other end of winding 80 is connected by a line 84 to the movable contact 86 of a single-pole seven-position lamp bank selection switch 88. Each of the seven fixed contacts is connected to a respectively associated one of the slip rings which are each connected to one of the banks of point source lamps or, in the case of one, to the center lamp 22a. Thus only the center lamp or one bank of lamps is lighted at a time and a different bank is lighted for each position of the selector switch 88.

In practicing the invention an undeveloped film is laid flat on the vacuum table and a master tint screen is laid on top of the film, the tint screen is masked except over that portion of the film which is to be tinted or shaded. One bank of point source lights is illuminated to expose the film. It will be explained below that the degree of tinting, in a positive screen, is increased by illuminating an outer bank of lights and is reduced by illuminating instead an inner bank of lights. The film having been thus exposed, exposure is terminated and all but those portions of the master screen which overlie areas of the film which are to be shaded or tinted in a different degree of density are masked to prevent exposure. Thereafter the film is again exposed to a bank of point source lights but this time a different bank is employed so that density of the pattern of the developed film will differ in tint or shading from that of the area first exposed.

This process may be repeated to produce more than two different shades in the finished film. Thus in the apparatus shown, seven different tints are possible by exposure to the center lamp 22a and the six bands of lamps in turn. The film is not subjected to exposure in variable degree. Instead the exposed points are fully exposed and the unexposed points are not exposed at all. Accordingly it is not necessary to mask the master tint screen over an area of the film when exposed to one bank of lamps when that same area will subsequently be exposed to a bank of lamps which are farther from the axis of the light source assembly. If the master tint screen is reversed, that is if the dots are opaque and the space between them transparent, then the converse is true as will be apparent to those skilled in the lithographic art.

In the preferred procedure for practicing the process, the film is placed emulsion side up on the vacuum table and is held flat by suction applied by pump 14 to table 12 via vacuum line 90. The master tint screen, which comprises a sheet of film, or other transparent material having opaque areas developed in a layer on one side, is placed over the film and is oriented so that its developed side is away from the film toward the lamp 22. This assembly is diagrammed in FIG. 3, which shows a portion 92 in cross section of a master tint screen which is formed, in the case shown, of exposed photographic film. The upper layer 94 of the screen, which was formerly coated with emulsion, has been exposed and developed so that dots 96 of the unexposed, developed upper layer 94 remain. The tint screen overlies an undeveloped film 98 whose emulsion layer 100 is up toward screen 92. Masking 95 overlies the screen 92 and prevents passage of light through the screen except at the area of the film 98 which is to be tinted.

FIG. 3 shows that light from lamp 22, passing through the transparent screen 92 through dot 96, will expose a dot on the emulsion 100 of film 98. This dot is shown enlarged in FIG. 4 which is to be compared with the two dots of FIG. 6 produced by exposing the film to two point source lights one on either side of the perpendicular to the dot 96. This arrangement is diagrammed in FIG. 5. The dots in FIG. 6 only partly overlap so an increased area of the film is exposed as shown. If the lamps 22 of FIG. 5 are rotated about the perpendicular through dot 96, as indicated in FIG. 7, then the exposed area will be circular as shown in FIG. 8 with an area larger than the exposed area shown in FIG. 4, they being shown to the source scale.

It is clear that the exposed area is increased as the light source is moved away from said perpendicular through the dot 96 of the screen. This increases the angle between the perpendicular and the light path from the source through the tint screen dot so the exposed area is larger.

Since the density of shading is determined by area of the exposure, since the exposed area is round whereby its area varies with the square of its radius, since the radius of exposure varies with the light angle, and since light angle varies with distance from the axis of the light assembly to the point source being employed, it is clear that successive banks of lights must be spaced less far apart as distance from the axis is increased if the percentage increase in shading is to be uniform when using one bank and then the next. Actual spacing for equal increments of shading requires only trigonometric computation when the separation between the light source assembly and the table, and when the number of shades to be produced, are defined.

Experience has demonstrated that whichever bank of lamps is illuminated, the degree of exposure through the transparent areas of a uniform tint screen is relatively independent of location within the area on the table 12 under the light source when the dimensions across that area are no greater than the separation between the lamps 22 and the table 12. The result is that large areas of the tint screen to be produced can be uniformly tinted in selected degree using one master tint screen.

The point sources of light 22 are advantageously comprised of a lamp covered by a shield which precludes emanation of light except in the direction of the table 12.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. The process for producing tint screens having areas of different shading density from a single master tint screen of uniform density using point sources of light and comprising the steps of:
   a. covering an area of unexposed film with a master tint screen;
   b. masking all but that portion of the master tint screen which overlies certain portions of the film to be shaded;
   c. exposing said certain portions of the film through said master tint screen to a point source of light while producing motion of the source relative to the screen and film that is circular and of one diameter in a plane substantially parallel to the screen and film;
   d. masking all but that portion of the master tint screen which overlies portions of the film to be shaded to a different density;
   e. exposing said other portions of the film through said master tint screen to a point source of light while producing motion of the source relative to the screen and film that is circular and of a second diameter in said plane parallel to the screen and film; and f. developing the film so exposed.

2. The invention defined in claim 1 in which the opaque surface of the master tint screen is held in a plane removed from but parallel to the unexposed film.

3. The process for producing tint screens having areas of different shading density from a single master tint screen of uniform density using point sources of light and comprising the steps of:
 a. covering an area of unexposed film with a master tint screen;
 b. masking all but that portion of the master tint screen which overlies certain portions of the film to be shaded;
 c. exposing said certain portions of the film through said master tint screen to a point source of light while producing relative motion between the source and film that is circular and of one diameter in a plane parallel to the film;
 d. masking all but that portion of the master tint screen which overlies portions of the film to be shaded to a different density;
 e. exposing said other portions of the film through said master tint screen to a point source of light while producing relative motion between the source and film that is circular and of a second diameter in said plane parallel to the film;
 f. developing the film so exposed; and
 g. in which said film is exposed simultaneously to a plurality of point sources of light all moving relatively to the film on the same diameter and in the same plane.

4. Apparatus for making multiple density tint screens comprising in combination, film-holding means for holding an unexposed film in a plane, a light source spaced from said film-holding means comprising a point source rotatable in a circle parallel to said first-mentioned plane and overlying said film-holding means, means for rotating said point source in its circle, and a uniformly shaded master tint screen interposed between said film holding means and said light source and adapted to lie flat against a film held in said film holding means;

in which said light source comprises a plurality of point light sources each equidistant from the center of said circle and each rotatable in said circle.

5. Apparatus for making multiple density tint screens comprising in combination, film-holding means for holding an unexposed film in a plane, a light source spaced from said film-holding means comprising a point source rotatable in a circle parallel to said first mentioned plane and overlying said film-holding means, means for rotating said point source in its circle, and a uniformly shaded master tint screen interposed between said film-holding means and said light source and adapted to lie flat against a film held in said film holding means;

in which said light source comprises a plurality of point sources each rotatable in a circle having different diameter and lying parallel to said film-holding means and all rotatable about a common axis, and means for illuminating selected ones of said point sources.

6. Apparatus for making multiple density tint screens comprising in combination, film-holding means for holding an unexposed film in a plane a light source spaced from said film-holding means comprising a point source rotatable in a circle parallel to said first-mentioned plane and overlying said film-holding means, means for rotating said point source in its circle, and a uniformly shaded master tint screen interposed between said film-holding means and said light source and adapted to lie flat against a film held in said film-holding means;

in which said light source comprises an assembly rotatable about an axis substantially normal to the central portion of said film-holding means, a plurality of point sources of light carried by said assembly each disposed at a different radial distance from said axis, and means for illuminating said point sources selectively, the difference between successive ones of the radial distances decreasing with radial distance.

7. The invention defined in claim 6 in which said light source comprises a plurality of point light sources at each of said radial distances and the point sources at equal radial distance being disposed on different radial lines eminating from said axis.